(12) United States Patent
Miyashiro et al.

(10) Patent No.: US 8,061,468 B2
(45) Date of Patent: Nov. 22, 2011

(54) VEHICLE

(75) Inventors: Shidehiko Miyashiro, Shizuoka (JP); Kiyohiko Oguri, Shizuoka (JP); Toshio Okamoto, Shizuoka (JP)

(73) Assignee: Yamaha Hatsudoki Kabushiki Kaisha, Shizuoka (JP)

(*) Notice: Subject to any disclaimer, the term of this patent is extended or adjusted under 35 U.S.C. 154(b) by 418 days.

(21) Appl. No.: 11/940,155

(22) Filed: Nov. 14, 2007

(65) Prior Publication Data

US 2008/0110687 A1      May 15, 2008

(30) Foreign Application Priority Data

Nov. 15, 2006   (JP) ................... 2006-308757
Feb. 1, 2007    (JP) ................... 2007-022581
Oct. 19, 2007   (JP) ................... 2007-272716

(51) Int. Cl.
    *B60K 13/04*   (2006.01)
(52) U.S. Cl. ........................ 180/296; 180/309
(58) Field of Classification Search .............. 180/296, 180/309
    See application file for complete search history.

(56) References Cited

U.S. PATENT DOCUMENTS

| 2,350,791 A | 6/1944 | Mennesson |
| 4,799,569 A | 1/1989 | Hattori et al. |
| 4,800,979 A * | 1/1989 | Tatsuji ........................ 180/227 |
| 5,016,725 A * | 5/1991 | Muramatsu .................. 180/225 |
| 6,719,084 B2 * | 4/2004 | Kuji et al. ...................... 180/309 |
| 7,044,253 B2 * | 5/2006 | Takenaka et al. ............ 180/219 |

FOREIGN PATENT DOCUMENTS

| EP | 0388820 A1 | 9/1990 |
| EP | 1681229 A2 | 7/2006 |
| JP | 57070731 A * | 5/1982 |
| JP | 04-018898 | 4/1992 |
| JP | 2001-278158 | 10/2001 |
| JP | 2003040175 A | 2/2003 |
| JP | 2003048591 A | 2/2003 |
| WO | 0121945 A1 | 3/2001 |

OTHER PUBLICATIONS

Partial European Search Report for corresponding European application 07022215.3 lists the references above.
Extended European Search Report for corresponding European application 07022215.3 lists the references above.

* cited by examiner

*Primary Examiner* — J. Allen Shriver, II
*Assistant Examiner* — Katy M Ebner
(74) *Attorney, Agent, or Firm* — Keating & Bennett, LLP

(57) ABSTRACT

A vehicle having a sufficient length of exhaust pipe and a member disposed above a rear suspension that is not too high. An exhaust pipe is connected to a rearward side of an engine. A rear suspension absorbs shocks generated when a rear wheel moves up and down. A coil-form part of the exhaust pipe is located between the rear suspension and a tire house of the rear wheel, within which the rear wheel moves up and down.

10 Claims, 7 Drawing Sheets

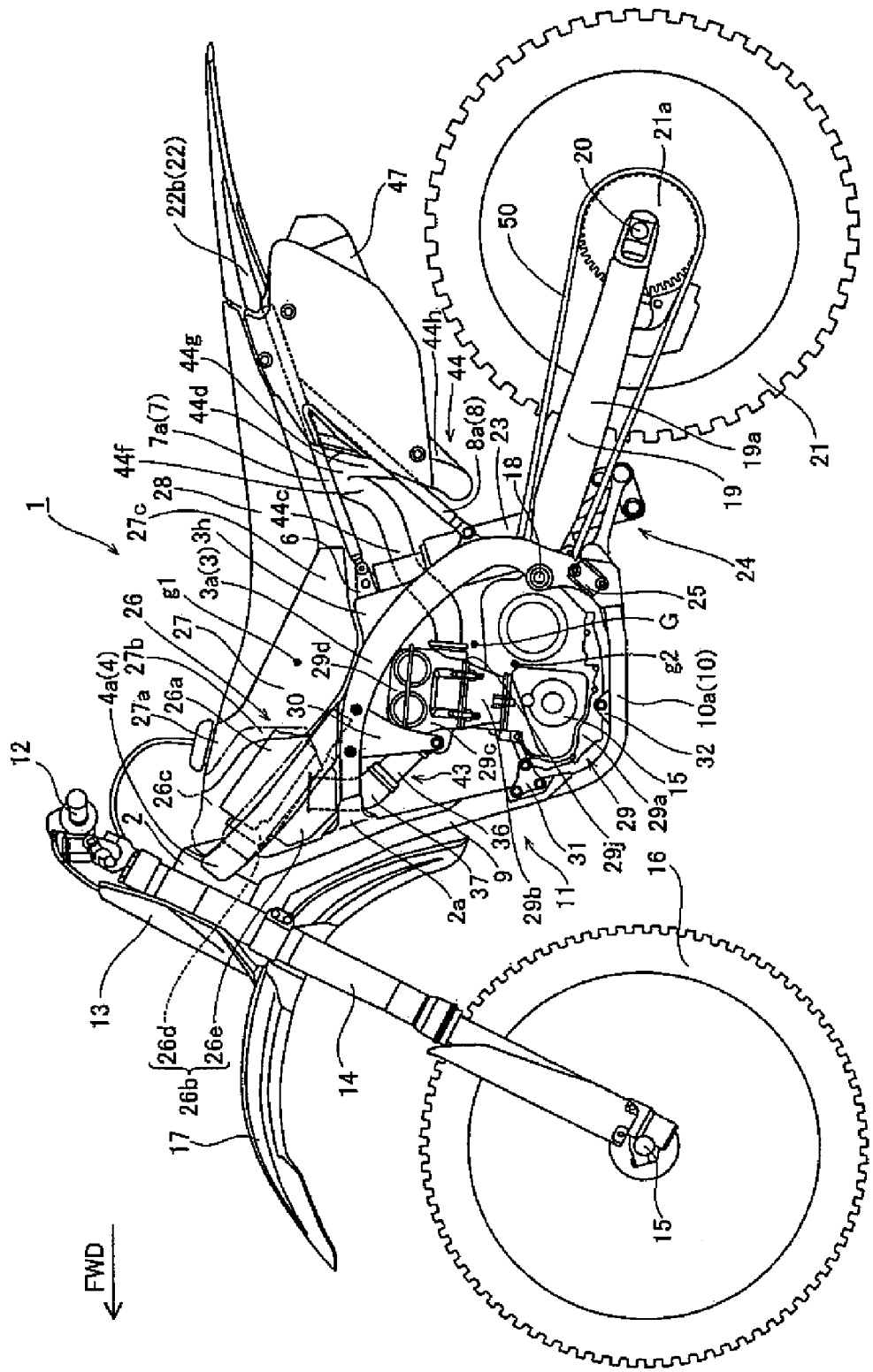
[FIG. 1]

[FIG. 2]
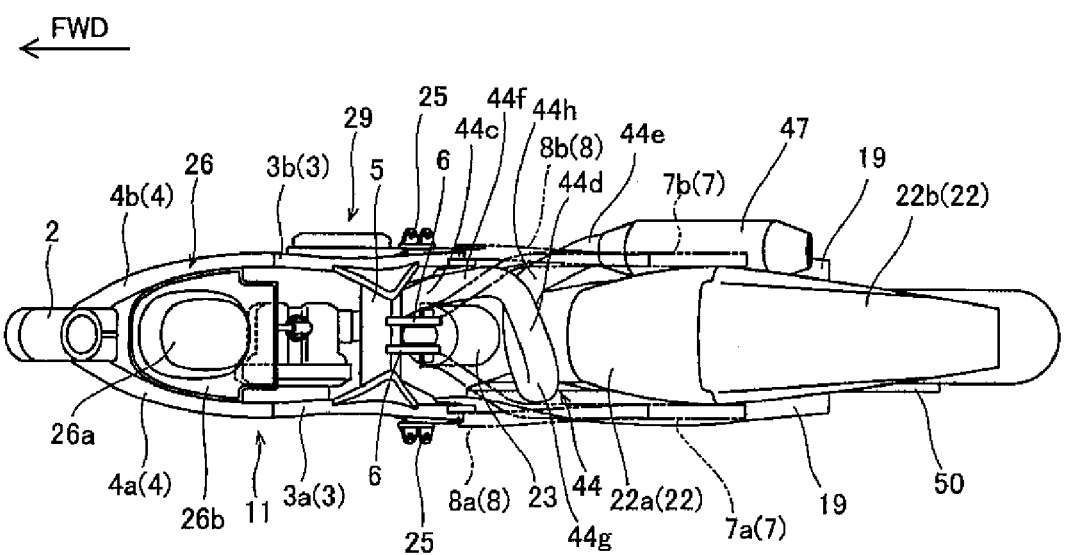

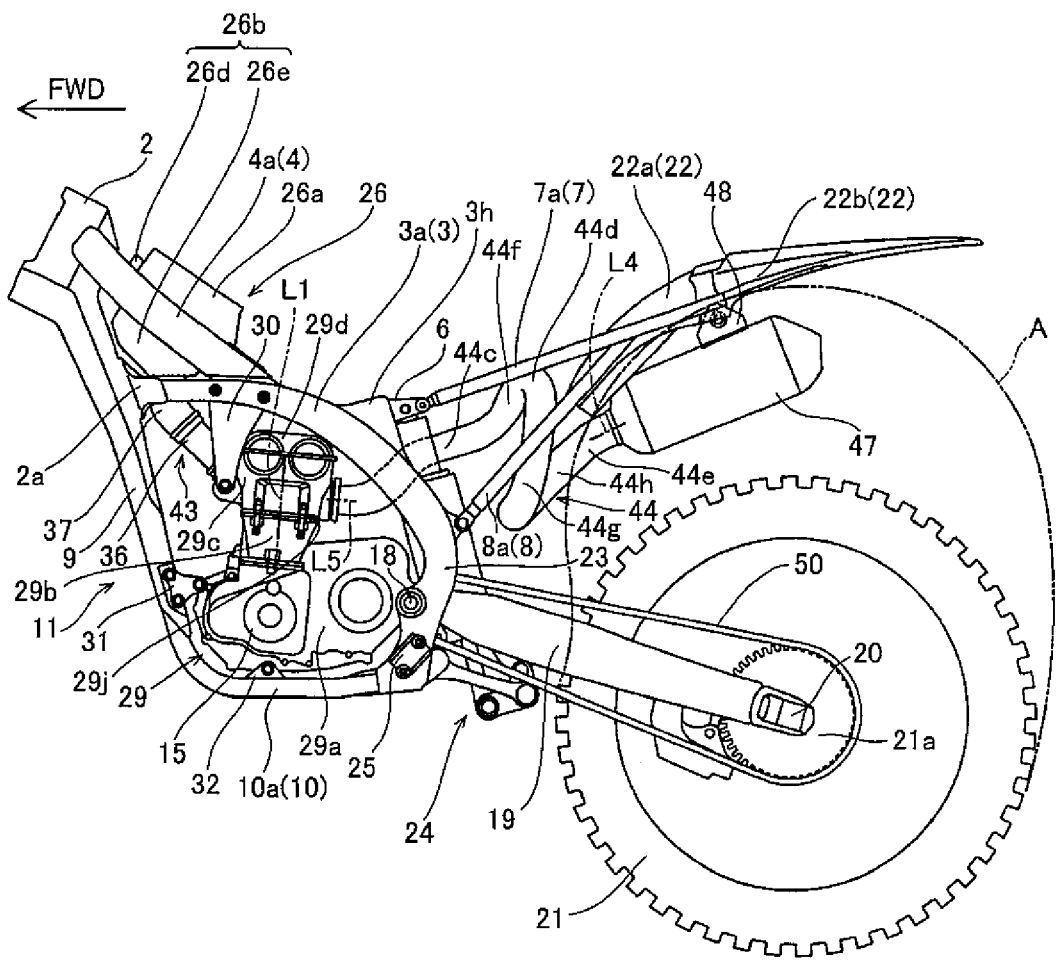
[FIG. 3]

[FIG. 4]
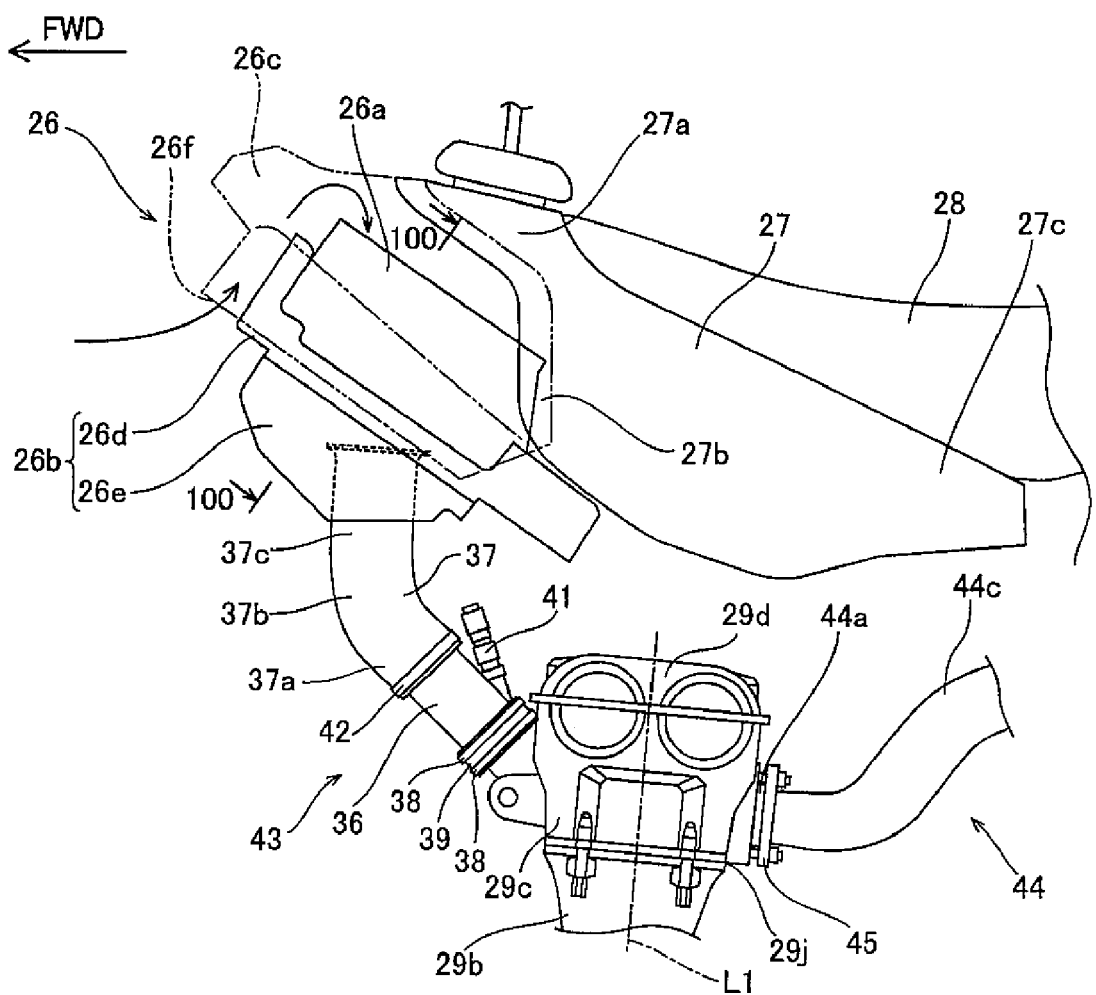

[FIG. 5]
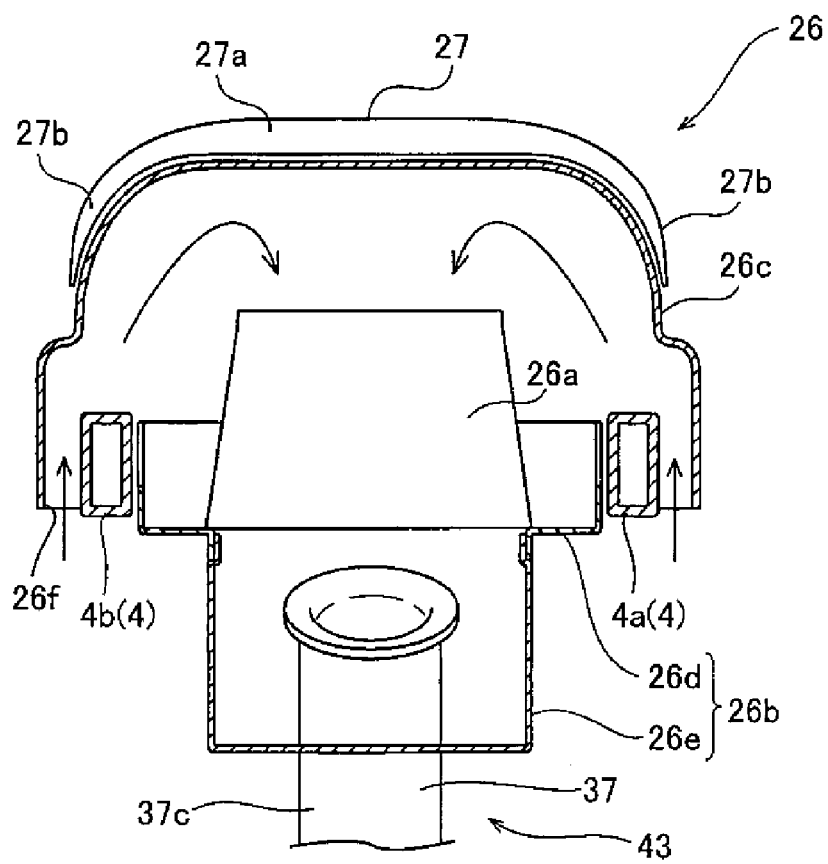

[FIG. 6]
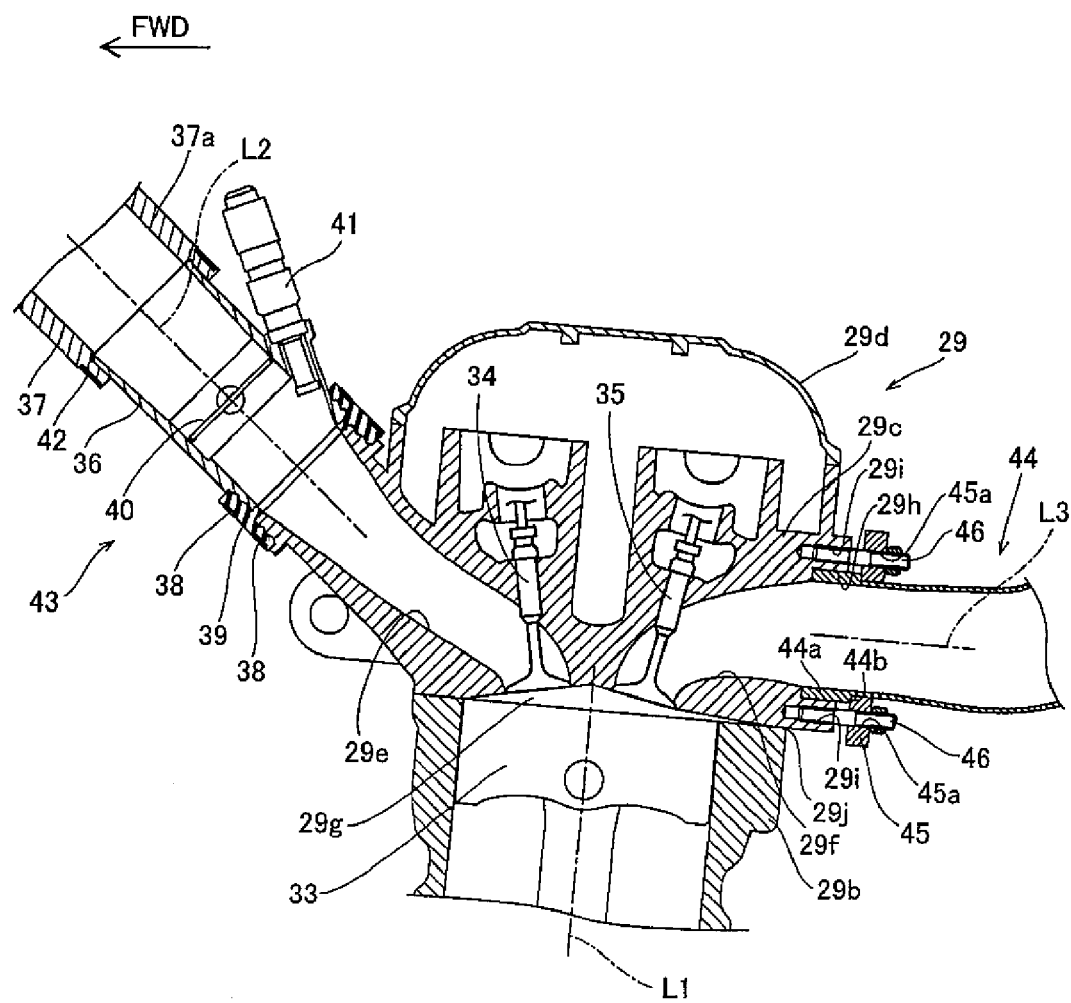

[FIG. 7]
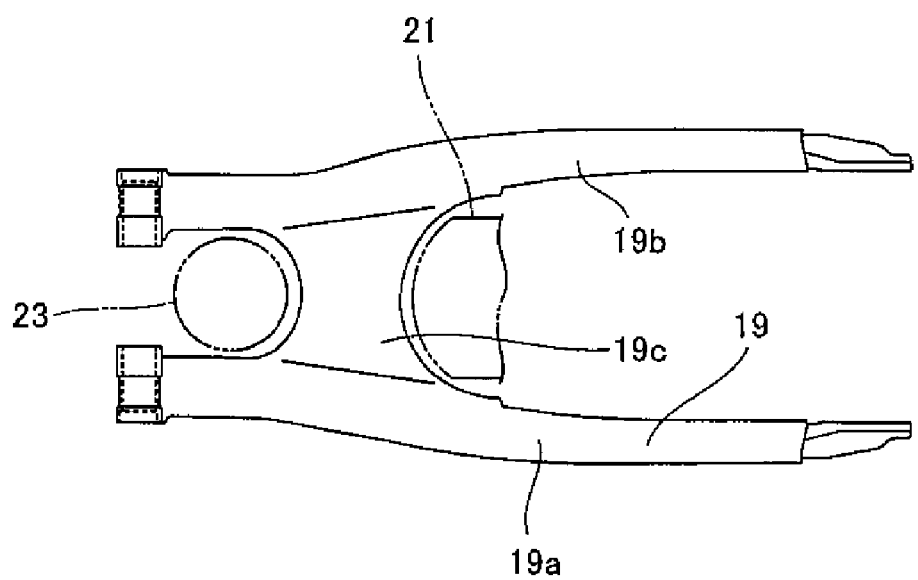

VEHICLE

RELATED APPLICATIONS

This application claims the benefit of priority under 35 USC 119 of Japanese patent application no. 2006-308757, filed on Nov. 15, 2006, Japanese patent application no. 2007-022581, filed on Feb. 1, 2007, and Japanese patent application no. 2007-272716, filed on Oct. 19, 2007, which applications are hereby incorporated by reference in their entireties.

BACKGROUND OF THE INVENTION

1. Field of the Invention

The present invention relates to a vehicle, and more particularly relates to a vehicle having an exhaust pipe.

2. Description of Related Art

Conventionally, a vehicle having an exhaust pile has been known. JP-Y-Hei 4-18898, for example, discloses a motorcycle having an exhaust pipe connected to a rearward side of an engine; a shock absorber (rear suspension) located below the exhaust pipe to absorb shocks generated when a rear wheel moves up and down; and a fuel tank located above the shock absorber and the exhaust pipe. In order to ensure a sufficient length of the exhaust pipe, a part of the exhaust pipe, which runs above the shock absorber, is formed into a shape curved in the vertical direction.

In the motorcycle of JP-Y-Hei 4-18898, the fuel tank is located above the shock absorber and the exhaust pipe, and the part of the exhaust pipe that runs above the shock absorber is formed into a shape curved in the vertical direction. This, however, leads to a problem that the location of the fuel tank is too high.

SUMMARY OF THE INVENTION

The present invention is made in order to solve the foregoing problem and provides a vehicle in which a member disposed above a rear suspension is not located too high, and in which a sufficient length of exhaust pipe is provided.

One aspect of the invention is a vehicle having an exhaust pipe connected to a rearward side of an engine. A rear suspension absorbs shocks generated when a rear wheel moves up and down. A winding-form part formed in the exhaust pipe is located between the rear suspension and a movable region of the rear wheel within which the rear wheel moves up and down.

As described above, the winding-form part of the exhaust pipe is located at the rear of and not above the rear suspension. The location of a member disposed above the rear suspension is thereby not too high. The winding-form part ensures that a sufficient length of exhaust pipe is provided.

In one embodiment, the winding-form part includes a portion connected to the engine and extending upward to the rear; a portion connected to the portion extending upward to the rear, while extending downward; and a portion extending further upward to the rear from the portion extending downward. The exhaust pipe and a silencer can thereby be connected at a lower location. Therefore, the locations of a seat rail and a seat disposed above the exhaust pipe and the silencer, and thus the rider's position, are not too high.

In another embodiment, the rear suspension is located in front of the rear wheel, and the winding-form part is located at the rear of the rear suspension and in front of the movable region of the rear wheel. The winding-form part is therefore not located above the rear suspension, which prevents the location of the member disposed above the rear suspension from being too high.

In this embodiment, a rear arm may be supported swingably by a body frame, and the exhaust pipe disposed apart from the rear arm by a given distance, when viewed from the side of the vehicle. Such a construction eliminates the need for a clearance designed to prevent the exhaust pipe from contacting the rear arm, and therefore, eliminates the need for the rear arm to have a thinner part. This ensures rigidity of the rear arm.

In another embodiment, the winding-form part is located at the rear of a fuel tank. The fuel tank is thereby not located above both the rear suspension and the winding-form part, and is thus not too high. A center of gravity of the fuel tank is therefore close to a center of gravity of the vehicle, when the center of gravity of the vehicle is located lower than the center of gravity of the fuel tank, thereby reducing the moment of inertia about the center of gravity of the vehicle. This improves operability of the vehicle about its center of gravity.

In another embodiment, a seat is at least partially located above the winding-form part. The locations of the winding-form part and the seat are thereby not above the rear suspension and therefore not too high.

In another embodiment, the winding-form part extends across a width direction of a vehicle body. The sizes of the winding-form part and the region between the rear suspension and the movable region are therefore not increased in a longitudinal direction of the vehicle body. The size of the vehicle body is thereby not increased in the longitudinal direction.

In another embodiment, a silencer is connected to the exhaust pipe and located at the upper side and the rear of the engine. A chain is located on the side opposed to the silencer in a vehicle width direction to drive the rear wheel. The winding-form part includes a portion located on the silencer side in the vehicle width direction; a portion connected to the portion located on the silencer side and extending toward the chain side in the vehicle width direction; and a portion connected to the portion extending toward the chain side, while being connected to the silencer. Such a construction allows the winding-form part to extend from the silencer side toward the chain side, and back to the silencer side. Thereby, a space defined between the silencer and the chain is more effectively utilized as a region where the winding-form part is disposed.

Another embodiment includes a body frame including a pair of frames located apart from each other at a predetermined interval in the width direction of the vehicle body. The winding-form part is located between the pair of frames. The size of the vehicle body is thereby not increased in the width direction, while a sufficient length of exhaust pipe is still ensured.

In another embodiment, a part of the exhaust pipe adjacent to a connecting part connected to the engine is substantially in a straight form. Exhaust resistance of air discharged from the engine is thereby reduced, and engine performance is improved.

In another embodiment, a silencer is connected to the exhaust pipe and located at the upper side and the rear of the engine. An axis of connection between the exhaust pipe and the silencer is higher than an axis of connection between the exhaust pipe and the engine. Such a construction allows the exhaust pipe to connect to the silencer without passing below the engine. Therefore, the exhaust pipe is not damaged by contact with the ground during off-road travel, such as on mountain roads.

The vehicle according to the invention may be an off-road motorcycle in which a sufficient length of exhaust pipe is provided, while the member disposed above the rear suspension is not too high.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIG. 1 is a side view of a motorcycle according to one embodiment of the present invention.

FIG. 2 is a top plan view of the motorcycle of FIG. 1.

FIG. 3 is a side view of a part of the motorcycle of FIG. 1.

FIG. 4 is a side view of an engine and its surroundings of the motorcycle of FIG. 1.

FIG. 5 is a sectional view taken along line 100-100 of FIG. 4.

FIG. 6 is a sectional view of the engine of the motorcycle of FIG. 1.

FIG. 7 is a top plan view of a rear arm of the motorcycle of FIG. 1.

DETAILED DESCRIPTION OF THE INVENTION

An embodiment of the present invention is now described with reference to the drawings.

FIG. 1 is a side view of a motorcycle 1 according to one embodiment of the present invention. FIGS. 2-7 illustrate a structure of motorcycle 1 according to the embodiment shown in FIG. 1. An off-road motorcycle is described as an example embodiment of the invention. The direction indicated by arrow FWD in the drawings is a forward traveling direction of the motorcycle.

In motorcycle 1, with reference to FIGS. 1 and 2, a left frame 3a and a right frame 3b of a main frame 3 are connected to a connecting part 2a of a head pipe 2. Left and right in this description are the left and right sides as viewed from a rider facing the forward traveling direction (the direction indicated by arrow FWD). Left frame 3a and right frame 3b extend downward to the rear. A left tank rail 4a and a right tank rail 4b of a tank rail 4 are located between a rear part of head pipe 2 and top parts of left frame 3a and right frame 3b. A top rear part of left frame 3a and a top rear part of right frame 3b are coupled with each other through a connecting member 5. A left rail 7a and a right rail 7b of a seat rail 7 extending upward to the rear are connected to connecting member 5 through a support 6 integrally formed with connecting member 5. A left stay 8a of a backstay 8 is connected between left frame 3a and left rail 7a of seat rail 7, and a right stay 8b of backstay 8 is connected between right frame 3b and right rail 7b of seat rail 7. Left stay 8a and right stay 8b are spaced from each other at a given interval in a width direction of the vehicle body (the left-right direction relative to the forward traveling direction). Left stay 8a and right stay 8b are an example of the "pair of frames" of the invention.

A down tube 9 extending downward to the rear is located on the bottom side of head pipe 2. A left bottom frame 10a and a right bottom frame of a bottom frame 10 connect a bottom end of down tube 9 and left frame 3a and right frame 3b. Head pipe 2, main frame 3, tank rail 4, seat rail 7, backstay 8, down tube 9, and bottom frame 10 form a body frame 11.

Handlebars 12 are pivotally disposed on the top of head pipe 2. A front number plate 13 covers the front part of head pipe 2. A pair of front forks 14 are located below head pipe 2. An axle 15 is fixed to bottom ends of front forks 14. A front wheel 16 is rotatably mounted to axle 15. A front fender 17 covers an upper part of front wheel 16.

A pivot shaft 18 provided through main frame 3 supports a front end of a rear arm 19 for vertical pivotal movement. As shown in FIG. 7, rear arm 19 includes a left arm 19a, a right arm 19b, and a coupling part 19c for coupling left arm 19a with right arm 19b. A rear suspension 23 is disposed in a region surrounded by a front part of left arm 19a, a front part of right arm 19b, and coupling part 19c. A rear wheel 21 is rotatably mounted to an axle 20 fixed to a rear end of rear arm 19. Rear wheel 21 is provided with a driven sprocket 21a that rotates together with rear wheel 21. A chain 50 meshes with driven sprocket 21a and is driven by an engine 29. Driven sprocket 21a and chain 50 are located on the left in the vehicle width direction. A rear fender 22 covers an upper part of rear wheel 21. As shown in FIG. 3, rear fender 22 comprises a front fender 22a integrally formed with a rear fender 22b.

Rear suspension 23 is located at the rear of main frame 3 and in front of rear wheel 21. An upper part of rear suspension 23 is supported by main frame 3 through support 6 (see FIG. 2) of connecting member 6, while a lower part of rear suspension 23 is coupled with rear arm 19 through a coupling member 24. This allows rear suspension 23 to absorb shocks generated when rear arm 19 and rear wheel 21 swing (move) up and down. Footrest holding plates 25 are fixed to left frame 3a and right frame 3b.

An air cleaner 26 is located between left tank rail 4a and right tank rail 4b, and in front of and above engine 29. As shown in FIG. 4, air cleaner 26 includes a sponge filter 26a, a cleaner case 26b for housing filter 26a therein, and a cover member 26c for covering an upper part of cleaner case 26b. Cleaner case 26b includes an upper case part 26d to which filter 26a is fixed, and a lower case part 26e in which a funnel 37 is disposed. An opening 26f is formed in a diagonally front lower part of cover member 26c. As shown in FIG. 5, air enters opening 26f and flows through filter 26a into lower case part 26e of cleaner case 26b. Opening 26f is located rearward relative to front number plate 13, which prevents foreign matter (water, pebbles, etc.) from entering opening 26f.

As shown in FIG. 4, a resin fuel tank 27 extends rearward from the rear side of air cleaner 26. This allows a center of gravity g1 of fuel tank 27 to be close to a center of gravity G of the vehicle, thereby reducing the moment of inertia about the center of gravity G of the vehicle and improving operability of the vehicle about its center of gravity G. The center of gravity G is located rearward of the center of gravity g1 of fuel tank 27 (FIG. 1). Fuel tank 27 includes an upper overlying part 27a, which lies over the upper part of air cleaner 26, a side overlying part 27b, which lies over the side part of air cleaner 26, and a rear overlying part 27c, which lies over the upper part of rear suspension 23. A front part of seat 28 is located above fuel tank 27 and rear suspension 23. Seat 28 extends to the rear of fuel tank 27.

Engine 29 is located below main frame 3. Engine 29 is fixed by a support plate 30 fastened to main frame 3, a support plate 31 fastened to down tube 9, and a support plate 32 fastened to bottom frame 10.

Engine 29 is oriented with its cylinder axis L1 (see FIG. 4) angled rearward by approximately 5 degrees. This allows a center of gravity g2 of engine 29 to be close to the center of gravity G of the vehicle, thereby reducing the moment of inertia about the center of gravity G of the vehicle. The center of gravity G of the vehicle is located rearward of the center of gravity g2 of engine 29. As shown in FIG. 6, engine 29 includes a crankcase 29a, a cylinder 29b having a piston 33 disposed therein, a cylinder head 29c disposed above cylinder 29b, and a cylinder head cover 29d.

Cylinder head 29c has therein an intake port 29e extending forward in engine 29, an exhaust port 29f extending rearward in engine 29, and a combustion chamber 29g to which intake port 29e and exhaust port 29f are connected. As described above, intake port 29e is formed on the forward side of engine 29 whose cylinder axis L1 is angled rearward. This allows a space to be created around intake port 29e formed on the forward side of engine 29, and therefore allows an intake pipe 43 in a straight form to be connected to intake port 29e. An intake valve 34 opens or closes intake port 29e, and an exhaust valve 35 opens or closes exhaust port 29f.

A throttle body 36 and funnel 37 made of resin are connected to intake port 29e. Specifically, a coupling member 39 made of rubber is fastened on its one end side (downstream side) to an opening end of intake port 29e by a band member 38. In turn, throttle body 36 extending obliquely upward in a straight form is fastened to coupling member 39 on its other end side (upstream side) by band member 38. A throttle valve 40 that adjusts the amount of air flowing through intake port 29e is disposed within throttle body 36. A fuel injector 41 that supplies fuel (gasoline) to engine 29 is attached to throttle body 36. Fuel injector 41 is mounted on the side opposed (rearward side) to the side where down tube 9 is disposed (forward side) with respect to throttle body 36. Funnel 37 that supplies air flowing through air cleaner 26 to engine 29 is fastened to throttle body 36 on its upstream side by a band member 42. Coupling member 39, throttle body 36, and funnel 37 form intake pipe 43. A lower part of intake pipe 43 is located between engine 29 and down tube 9.

As shown by an axis L2 in FIG. 6, a part of intake port 29e on its upstream side, coupling member 39, throttle body 36 and a downstream part 37a of funnel 37 are substantially in a straight form extending upward to the front. As described above, the part of intake pipe 43 adjacent to engine 29 is in a straight form, which reduces intake resistance of air drawn into engine 29, as compared to a case where the part of intake pipe 43 adjacent to engine 29 is curved, or where a part of intake pipe 43 spaced apart from engine 29 is in a straight form. This improves performance of engine 29.

As shown in FIG. 4, funnel 37 also includes a curved part 37b, located upstream of downstream part 37a and an upstream part 37c located upstream of curved part 37b and extending substantially right upward toward air cleaner 26 in a straight form. An upper part of upstream part 37c is located within air cleaner case 26b.

As shown in FIG. 6, an exhaust pipe 44 is connected to exhaust port 29f on the rearward side of cylinder head 29c. Two screw holes 29i and recesses 29h are formed adjacent to an opening end of exhaust port 29f. A connecting part 44a of exhaust pipe 44 is inserted into recess 29h. A step 44b is formed at a downstream end of connecting part 44a to attach a fixing member 45 to step 44b. Stud bolts 46 are screwed into two screw holes 45a of fixing member 45 and two screw holes 29i of cylinder head 29c, to fasten fixing member 45 to cylinder head 29c. In this manner, connecting part 44a of exhaust pipe 44 is fixed to cylinder head 29c. As shown in FIG. 3, when viewed from the side of the vehicle, exhaust pipe 44 is disposed at a location apart from rear arm 19 with a given distance in the vertical direction.

As shown by an axis L3 in FIG. 6, a part of exhaust pipe 44 adjacent to connecting part 44a connected to cylinder head 29c is substantially in a straight form, which reduces exhaust resistance of air discharged from engine 29, compared to a case where the part of exhaust pipe 44 adjacent to engine 29 is curved, or where a part of exhaust pipe 44 spaced apart from engine 29 is in a straight form. This further improves performance of engine 29.

As shown in FIG. 3, exhaust pipe 44 has a portion 44c connected to the straight-form part adjacent to engine 29 and extending upward to the rear. Exhaust pipe 44 also has a coil-form part 44d connected to portion 44c extending upward to the rear and a rear part 44e extending upward to the rear and located downstream of coil-form part 44d. Coil-form part 44d is an example of the "winding-form part" of the invention.

As shown in FIG. 3, coil-form part 44d is located at the rear of rear suspension 23 and in front of tire house A of rear wheel 21. In other words, coil-form part 44d is located in a region defined between rear suspension 23 and tire house A of rear wheel 21. Tire house A is an example of the "movable region" of the invention.

As shown in FIG. 1, coil-form part 44d is also located at the rear of fuel tank 27. Thereby, fuel tank 27 is not located above both rear suspension 23 and coil-form part 44d, and is thus not too high. This allows the center of gravity g1 of fuel tank 27 to be close to the center of gravity G of the vehicle, the center of gravity G being located lower relative to the center of gravity g1 of fuel tank 27, thereby reducing the moment of inertia about the center of gravity G of the vehicle. This improves operability of the vehicle about its center of gravity G. Coil-form part 44d is also located below seat 28 and rearward relative to a center part of seat 28, and is below a top surface of seat rail 7.

As shown in FIG. 2, coil-form part 44d has a winding form that extends across the width direction of the vehicle body. Specifically, coil-form part 44d includes a portion 44f extending upward to the rear from the upstream side toward the downstream side and located on the right in the vehicle width direction; a portion 44g connected to portion 44f and extending downward on the left in the vehicle width direction; and a portion 44h connected to portion 44g, located on the right of the vehicle width direction, and extending further upward to the rear. Portion 44f is an example of the "portion extending upward to the rear" and "portion located on the silencer side" of the invention. Portion 44g is an example of the "portion extending downward" and the "portion extending on the chain side" of the invention. Portion 44h is an example of the "portion extending further upward to the rear from the portion extending downward" and the "portion connected to the silencer side" of the invention.

Coil-form part 44d is located between the inner sides of left stay 8a and right stay 8b of body frame 11, when viewed in plan.

Rear part 44e of exhaust pipe 44 is connected to muffler 47 located at the upper side and the rear of engine 29. Muffler 47 is located on the right in the vehicle width direction. In addition, muffler 47 is supported by right rail 7b (see FIG. 2) of seat rail 7 through a support plate 48. Muffler 47 is an example of the "silencer" of the invention.

An axis of connection L4 between rear part 44e of exhaust pipe 44 and muffler 47 is disposed at a location higher than an axis of connection L5 between connecting part 44a of exhaust pipe 44 and engine 29. In addition, axes of connection L4 and L5 are higher than rear end 29j of a cylinder plane (top surface of cylinder 29b) of engine 29.

All parts of exhaust pipe 44 are disposed at a location higher than axle 20, rear arm 19, and crankcase 29a of engine 29. This allows exhaust pipe 44 to connect to muffler 47 without passing below axle 20, rear arm 19, engine 29 and so forth. Therefore, exhaust pipe 44 is not damaged by contact with the ground, for example, during off-road travel, such as mountain roads.

As described above, in the embodiment of the invention, exhaust pipe 44 includes coil-form part 44d that is formed between rear suspension 23 and tire house A of rear wheel 21. Thus coil-form part 44d is located behind and not above rear suspension 23. Therefore, the locations of fuel tank 27 and seat 28, both disposed above rear suspension 23, are not too high. In addition, coil-form part 44d ensures a sufficient length of exhaust pipe 44.

In the embodiment of the invention, coil-form part 44d winds to extend across the width direction of the vehicle body, thereby limiting the size of coil-form part 44d and the region between rear suspension 23 and tire house A in the longitudinal direction of the vehicle body. The vehicle body is thereby not increased in size in the longitudinal direction.

In the embodiment of the invention, coil-form part 44d includes portion 44f extending upward to the rear, portion 44g connected to portion 44f and extending downward, and portion 44h extending further upward to the rear from portion 44g. This allows exhaust pipe 44 and muffler 47 to be connected at a lower location. Therefore, the locations of seat rail 7 and seat 28, both disposed above exhaust pipe 44 and muffler 47, and thus the rider's position, are not too high.

In the embodiment of the invention, exhaust pipe 44 is disposed apart from rear arm 19 with a given distance in the vertical direction, when viewed from the side. This eliminates the need for a clearance designed to prevent exhaust pipe 44 from contacting rear arm 19, and therefore eliminates the need for rear arm 19 to have a thinner part. This ensures rigidity of rear arm 19.

In the embodiment of the invention, coil-form part 44d includes portion 44f located on the muffler 47 side (right side) in the vehicle width direction, portion 44g connected to portion 44f and extending toward the chain 50 side (left side) in the vehicle width direction, and portion 44h connected to portion 44g and located on the muffler 47 side (right side) in the vehicle width direction. This allows coil-form part 44d to be formed to extend from the muffler 47 side (right side) toward the chain 50 side (left side) and back to the muffler 47 side (right side). Thereby, the space between muffler 47 and chain 50 is more effectively utilized as a region where coil-form part 44d is disposed.

In the embodiment of the invention, left stay 8a and right stay 8b are spaced apart from each other at a predetermined interval in the width direction of the vehicle body, and coil-form part 44d is located between left stay 8a and right stay 8b. This prevents an increase in size of the vehicle body in its width direction while ensuring a sufficient length of exhaust pipe 44.

The embodiment disclosed herein is illustrative in all respects, and does not impose any limitation. The scope of the present invention is defined by the scope of the claims rather than by the descriptions of the embodiment, and includes all modifications falling within the scope of the claims and equivalents thereof.

Application of the invention to a motorcycle has been described as one example. However, the present invention is applicable to other vehicles, such as automobiles, bicycles, tricycles, and all terrain vehicles (ATVs).

In addition, the invention is not limited to off-road motorcycles and vehicles, and may be applied to on-road motorcycles and vehicles.

The winding-form part of the exhaust pipe has been described as winding to extend across the width direction of the vehicle body. However, the invention is not limited to that, and the winding-form part may wind to extend along the longitudinal direction of the vehicle body.

The coil-form part of the exhaust pipe has been described as located at the rear of the fuel tank. However, the present invention is not limited to that, and the coil-form part may be located below the fuel tank.

The engine has been described as oriented with its cylinder axis angled rearward. However, the present invention is not limited to that, and the engine may be oriented with its cylinder axis angled forward or extending vertically.

The part of the exhaust pipe adjacent to the connecting part connected to the engine has been described as substantially in a straight form. However, the invention is not limited to that, and the part of the exhaust pipe adjacent to the connecting part connected to the engine may not be necessarily in a straight form.

The invention claimed is:

1. A motorcycle comprising:
an engine;
an exhaust pipe connected to a rearward side of the engine;
a rear wheel; and
a shock absorber arranged to absorb shocks generated when the rear wheel moves up and down; wherein
the exhaust pipe includes a winding-form part;
the winding-form part is defined by a first longitudinal length portion extending upward and rearward, a second longitudinal length portion connected to the first longitudinal length portion and extending downward, and a third longitudinal length portion connected to the second longitudinal length portion and extending upward and rearward;
each of the first, second, and third longitudinal length portions of the winding-form part of the exhaust pipe are located behind the shock absorber; and
the winding-form part of the exhaust pipe includes at least two of the first, second, and third longitudinal length portions extending substantially straight across a width of the motorcycle in a motorcycle width direction as seen from above the motorcycle.

2. The motorcycle according to claim 1, wherein:
the shock absorber is located in front of the rear wheel, and
the winding-form part is located behind the shock absorber and in front of the movable region of the rear wheel.

3. The motorcycle according to claim 2, further comprising a rear arm supported swingably by a body frame, wherein the exhaust pipe is disposed apart from the rear arm by a given distance, when viewed from the side of the motorcycle.

4. The motorcycle according to claim 1, further comprising a fuel tank, wherein the winding-form part is located at the rear of the fuel tank.

5. The motorcycle according to claim 1, further comprising a seat that is at least partially located above the winding-form part.

6. The motorcycle according to claim 1, further comprising:
a silencer connected to the exhaust pipe and located at the upper side and the rear of the engine; and
a chain located on the side opposed to the silencer in the motorcycle width direction to drive the rear wheel,
wherein:
the first longitudinal length portion is located on the silencer side in the motorcycle width direction;
the second longitudinal length portion is connected to the first longitudinal length portion and extending toward the chain side in the motorcycle width direction; and the third longitudinal length portion is connected to the second longitudinal length portion and connected to the silencer.

7. The motorcycle according to claim 1, further comprising a body frame including a pair of frames located apart from each other at a predetermined interval in the motorcycle width direction,
wherein the winding-form part of the exhaust pipe is located between inner sides of the pair of frames of the body frame.

8. The motorcycle according to claim 1, wherein a part of the exhaust pipe adjacent to a connecting part connected to the engine is substantially straight.

9. The motorcycle according to claim 1, further comprising:
a silencer connected to the exhaust pipe and located at the upper side and the rear of the engine,
wherein an axis of connection between the exhaust pipe and the silencer is above an axis of connection between the exhaust pipe and the engine.

10. The motorcycle according to claim 1, wherein the motorcycle is an off-road motorcycle.

\* \* \* \* \*